Figure 1:
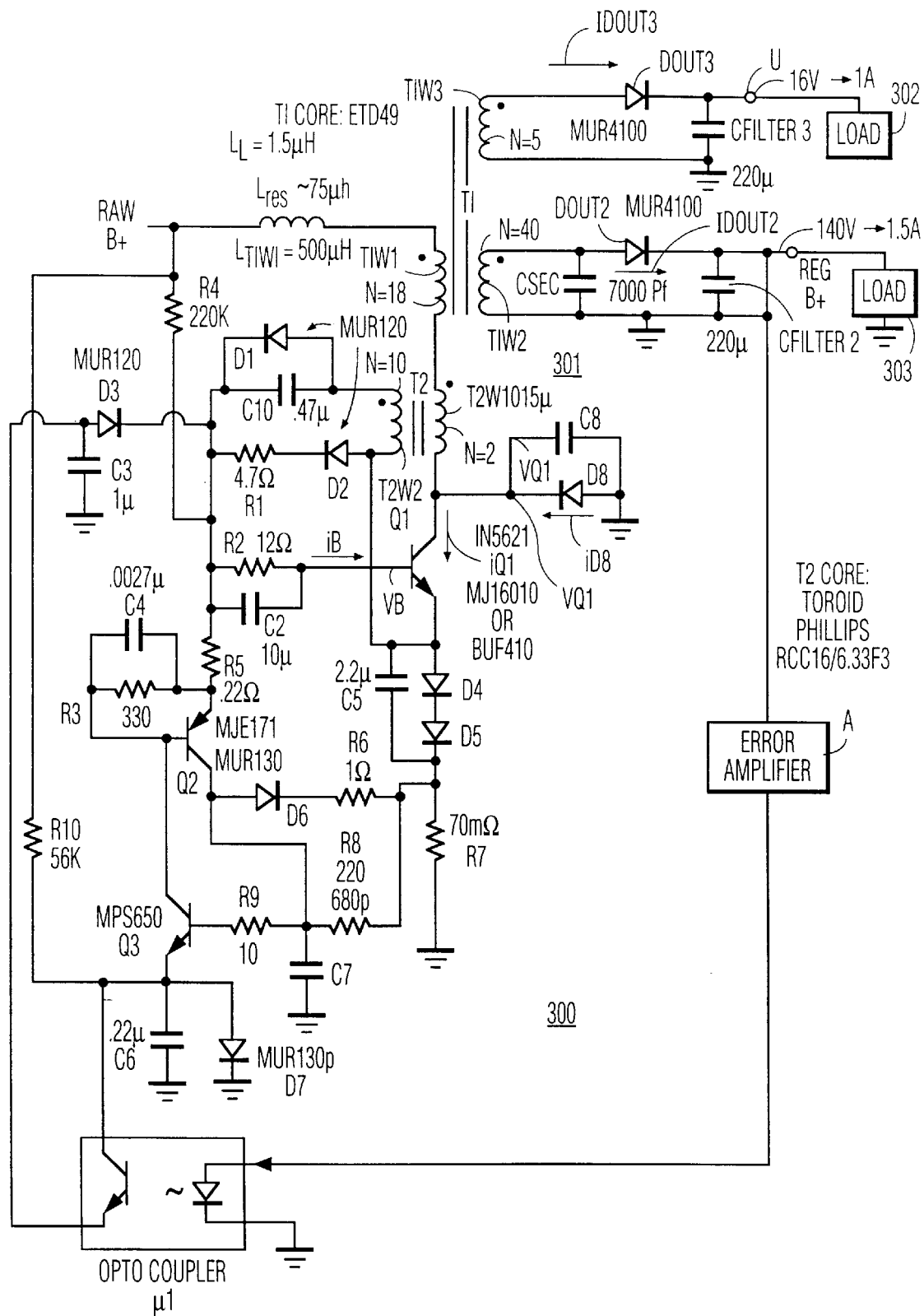

United States Patent [19]

Fitzgerald

[11] Patent Number: 5,877,946
[45] Date of Patent: Mar. 2, 1999

[54] FORWARD CONVERTER WITH AN INDUCTOR COUPLED TO A TRANSFORMER WINDING

[75] Inventor: William Vincent Fitzgerald, Zionsville, Ind.

[73] Assignee: Thomson Consumer Electronics, Inc., Indianapolis, Ind.

[21] Appl. No.: 951,252

[22] Filed: Oct. 16, 1997

Related U.S. Application Data

[63] Continuation of Ser. No. 716,491, Sep. 12, 1996.

[51] Int. Cl.$^6$ .................................................. H02M 3/335
[52] U.S. Cl. ................................ 363/21; 363/97; 363/131
[58] Field of Search ................................ 363/20, 21, 95, 363/97, 98, 56, 131, 132; 323/222, 223, 902

[56] References Cited

U.S. PATENT DOCUMENTS

| | | | |
|---|---|---|---|
| 3,512,040 | 5/1970 | Lester | 315/27 |
| 4,037,271 | 7/1977 | Keller | 363/21 |
| 4,276,586 | 6/1981 | Boekhorst | 363/21 |
| 4,438,485 | 3/1984 | Voigt | 363/21 |
| 4,785,387 | 11/1988 | Lee et al. | 363/21 |
| 4,855,888 | 8/1989 | Henze et al. | 363/17 |
| 4,857,822 | 8/1989 | Tabisz et al. | 323/282 |
| 4,930,060 | 5/1990 | Leonardi | 363/21 |
| 4,931,716 | 6/1990 | Jovanovic et al. | 323/285 |
| 4,945,465 | 7/1990 | Marinus et al. | 363/89 |
| 5,066,900 | 11/1991 | Bassett | 323/224 |
| 5,117,347 | 5/1992 | Rebello et al. | 363/56 |
| 5,140,512 | 8/1992 | O'Sullivan | 363/24 |
| 5,173,846 | 12/1992 | Smity | 363/20 |
| 5,177,675 | 1/1993 | Archer | 363/25 |
| 5,180,964 | 1/1993 | Ewin | 323/222 |
| 5,267,133 | 11/1993 | Motomura et al. | 363/21 |
| 5,297,014 | 3/1994 | Saito et al. | 363/21 |
| 5,313,381 | 5/1994 | Balakrishnan | 363/147 |
| 5,315,496 | 5/1994 | Okochi et al. | 363/21 |
| 5,349,514 | 9/1994 | Ushiki et al. | 363/97 |
| 5,471,376 | 11/1995 | Tsai et al. | 363/20 |
| 5,521,807 | 5/1996 | Chen et al. | 363/21 |
| 5,600,546 | 2/1997 | Ho et al. | 363/21 |
| 5,604,425 | 2/1997 | Smith | 323/267 |
| 5,612,862 | 3/1997 | Marusik et al. | 363/93 |

FOREIGN PATENT DOCUMENTS

| | | |
|---|---|---|
| 043761 | 6/1981 | European Pat. Off. . |
| 240312 | 3/1987 | European Pat. Off. . |
| 259889 | 9/1987 | European Pat. Off. . |
| 2460579 | 6/1979 | France . |

OTHER PUBLICATIONS

Tokimune Kitajima et al., "Reduction of Power Loss In Voltage Resonant Converter", Thirteenth Int'l Telecommunications Energy Conference, Kyoto, Japan, Nov. 1991, pp. 145–150.

U.S. Appln. 08/891,843 filed Jul. 10, 1997 which is a File Wrapper Continuation of U.S. Appln. 08/537,965 filed Oct. 2, 1995.

Power Supply Cookbook, Marty Brown, Motorola, 1994, p. 137.

"Zero–Voltage Switching Technique in High Frequency Off Line Converter", M. Jovanovic et al., IEEE PESC Record 1988, pp. 23–32.

K. Liu, F.C. Lee, "Zero–Voltage Switching Technique in DC/DC Converters", IEEE PESC Record 1986, pp. 58–70.

K. Liu, F.C. Lee, "Resonant Switches–A Unified Approach to Improve Performances of Switching Converters", IEEE International Telecommunications Energy Conference Proceedings, 1984, pp. 344–351.

*Primary Examiner*—Adolf Berhane
*Attorney, Agent, or Firm*—Joseph S. Tripoli; Joseph J. Laks; Sammy S. Henig

[57] ABSTRACT

A forward converter includes a chopper transformer having a primary winding and one or more secondary windings. A corresponding rectifier and a corresponding filter capacitor is coupled to each secondary winding. An inductor is coupled in series with the primary winding. A low impedance current path that includes the corresponding rectifier is formed between each secondary winding and the corresponding filter capacitor. The inductor limits the rate of change of the current in each current path.

13 Claims, 2 Drawing Sheets

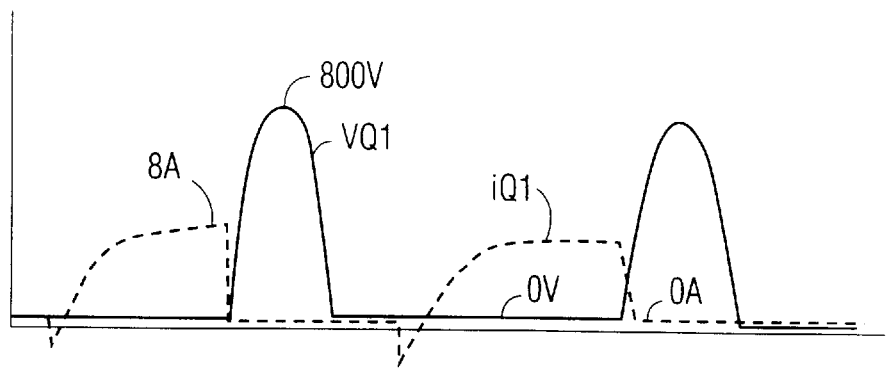
FIG. 2a
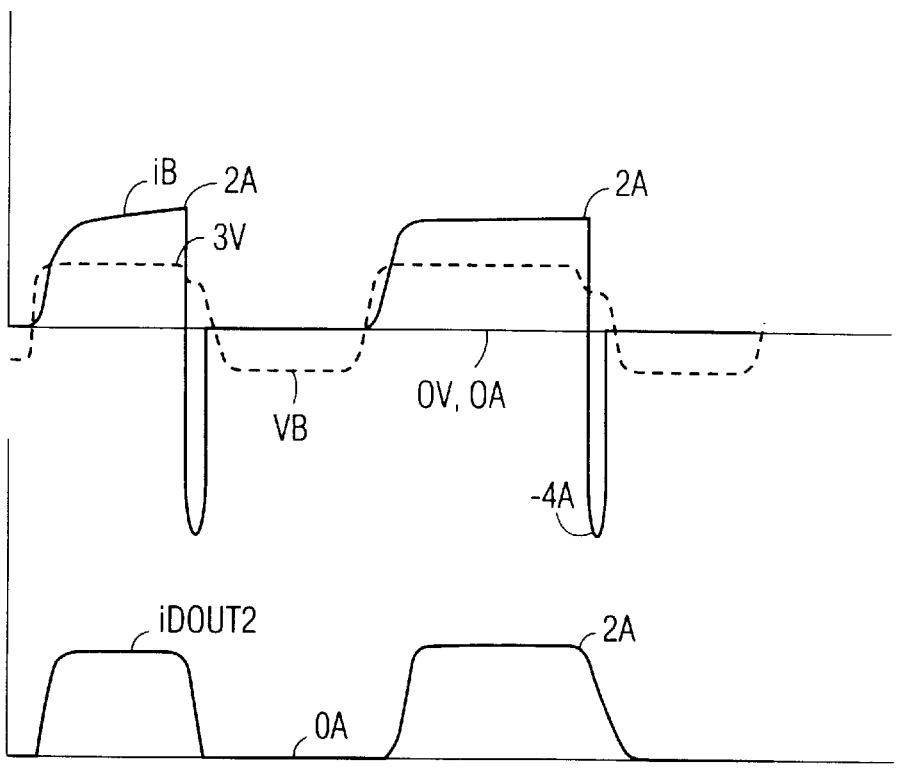
FIG. 2b
FIG. 2c
FIG. 2d

FORWARD CONVERTER WITH AN INDUCTOR COUPLED TO A TRANSFORMER WINDING

This is a continuation of application Ser. No. 08/716,491, filed Sep. 12, 1996.

The invention relates to a switch mode power supply (SMPS). In particular, the invention relates to a forward voltage converter.

A SMPS produces a regulated DC output by varying the timing at which a switch such as a transistor turns on and off for coupling a raw supply voltage to the primary winding of a transformer. The regulated output is obtained by rectifying the voltage produced on a secondary winding of the transformer, and is fed back to a drive or control circuit that triggers switching.

In a resonant or tuned type zero voltage switching SMPS, a transistor switch on the primary winding of a transformer is coupled in parallel with a clamping diode and in series with the primary winding. A capacitor is coupled to the primary winding to form a resonant circuit with the inductance of the primary winding. A substantially sinusoidal voltage is generated across the inductance, during a portion of each period. At the end of a half cycle of oscillation, the diode conducts and clamps the collector of the transistor switch at zero volts. Switching the transistor on occurs when the collector voltage is at zero voltage for minimizing switching losses. The resonant circuit reduces the voltage across the transistor when the transistor is switched off, as compared to a comparable non-resonant switch mode supply.

In a forward converter, power from the raw or unregulated input voltage is coupled to the output during conduction of the switching transistor. In a typical half-forward converter configuration of this type, the secondary winding of the transformer is coupled to a rectifying diode, an inductor or choke and a filter capacitor, coupled in series. The aforementioned series diode is coupled between the secondary winding and a clamping catch diode. The cathodes of the two diodes are coupled to the series inductor or choke and then to the filter or output capacitor. An output supply voltage is developed in the filter capacitor.

A buck effect is produced such that during forward conduction on the primary winding, the series diode on the secondary winding conducts. The choke limits the rate of change of the current in the series diode. When the transistor switch on the primary winding is turned off, the inductor on the primary-side resonant circuit reverses the voltage on the secondary winding of the transformer, causing the series diode to turn off. Instead, the catch diode provides a current path for conducting the current in the choke. A feedback signal is obtained from the voltage on the capacitor for controlling the timing of switching of the transistor switch.

Inasmuch as the feedback control responds to the voltage on the output capacitor associated with the secondary winding, the output supply responds to changes in current loading on the secondary in a manner which regulates the output voltage. However, a problem may be encountered when several secondary windings are provided, for example, to produce different operational voltages. A change in current loading on a secondary winding, other than the one from which the feedback signal is obtained, may not be reflected fully in the feedback signal. This is due to the high impedance inserted by the aforementioned series inductor or choke. To obtain more accurate control of all the output voltages produced from the voltages in the secondary windings, it may be advantageous to reduce the impedance between each secondary winding and the associated filter capacitor.

In accordance with an inventive feature, an inductor is coupled in series with the primary winding of the transformer. The inductor limits the rate of change of the current in each current path that includes a corresponding secondary winding, during forward conduction operation. Thus, the limiting inductor is common to each of the current paths. Therefore, advantageously, the aforementioned choke can be eliminated. The result is that each secondary winding is coupled via a corresponding rectifier to a corresponding filter capacitor via a low impedance current path. In contrast, in prior art forward converters, the high impedance choke isolates each secondary winding from its filter capacitor. Advantageously, the low impedance current path increases the output power capability of the power supply and facilitates improved tracking between rectified output voltages produced from voltages in the corresponding secondary windings.

A forward converter, embodying an inventive feature, includes a transformer having a first winding and a second winding. A source of an input supply voltage is provided. A switching transistor is responsive to a periodic switching control signal for periodically applying the input supply voltage to the first winding. A rectifier is coupled to the second winding for rectifying a transformer-coupled voltage in the second winding to generate a rectified output supply voltage coupled to a load. The output supply voltage is generated during a portion of a given period when the input supply voltage is applied to the first winding, to provide forward converter operation. An inductor is coupled to the second winding via the first winding for limiting a rate of change of a current flowing in the rectifier. A control circuit generates the switching control signal, having switching timings that control the output supply voltage.

FIG. 1 is a schematic diagram showing an exemplary embodiment of the circuit of the invention; and FIGS. 2a through 2d are timing diagrams showing voltages and currents at several points identified in the schematic diagram of FIG. 1, through two switching cycles.

Referring to FIG. 1, an exemplary zero voltage switching forward converter or power supply 300, embodying an inventive feature, is shown. Power, for example, 200 watts, is supplied to loads 303 and 302 coupled to secondary windings T1W2 and T1W3 of a chopper transformer T1, respectively, during the "on" or conducting time of a switching transistor Q1. Switching or chopper NPN transistor Q1 operates as a switch in series with a primary winding T1W1 of chopper transformer T1 for conducting current from an input supply, direct current (DC) voltage RAW B+. Transformer T1 can be considered a supply or coupling transformer. A current transformer T2, which can be considered a control transformer, supplies base current drive to the switching transistor Q1 and its control circuit.

Supply or coupling transformer T1 can serve, for example, as an isolation transformer separating the hot and cold grounds in a consumer electronic apparatus. Voltage RAW B+ can be derived, in that case, from a bridge rectifier that rectifies a mains supply voltage, and is coupled to a filter capacitor (not shown). The input voltage can also be provided from some other direct current source.

Also in series with transistor Q1 is a current sensing resistor R7. A damper diode D8 clamps the collector of transistor Q1 relative to ground, as explained later on. Capacitor C8 is coupled in parallel with diode D8 and also to primary winding T1W1. A resonant circuit 301 is formed, comprising capacitor C8, a reflected capacitance CSEC, an inductor $L_{res}$, primary winding T1W1 and a primary winding T2W1 of transformer T2. Primary winding T1W1 is coupled in series with the primary winding T2W1 of current transformer T2 which provides base current drive for transistor Q1, as explained below.

The resonant circuit produces a resonant voltage VQ1 when transistor switch Q1 is turned off, and in particular causes the voltage VQ1 across transistor Q1 (and on capacitor C8) to rise to a peak and then fall to zero in a substantially sinusoidal half wave. After resonant voltage VQ1 becomes zero, diode D8 clamps voltage VQ1 to ground potential. Transistor Q1 is then switched on again at zero volts to provide for zero voltage switching.

One secondary winding T1W3 of transformer T1 is coupled to an anode of a rectifier diode DOUT3, the cathode of which is coupled to a filter capacitor CFILTER3. Winding T1W3 is coupled via a low impedance current path, during forward conduction operation, to filter capacitor CFILTER3 and to load 302. Unlike some prior art circuits, no choke is provided in series with secondary winding T1W3, whereby the impedance in the current path between secondary winding T1W3 and filter capacitor CFILTER3 is, advantageously, kept low.

Similarly, a second secondary winding T1W2 is coupled through rectifier diode DOUT2 to filter capacitor CFILTER 2 to provide output voltage REG B+. Secondary winding T1W2 is also coupled via a low impedance current path to filter capacitor CFILTER2. Likewise, the current path has a low impedance because no choke is used.

Capacitor CSEC can be included in one or both of the secondary winding circuits T1W2 and T1W3 in parallel with the winding on the anode of the respective rectifier. Capacitor CSEC is transformer coupled to winding T1W1 forming a part of the resonant capacitance, as indicated before, of resonant circuit 301.

Control of the duty cycle of transistor switch Q1 is based on, for example, sensing output voltage REG B+ directly, rather than output voltage U. An error amplifier A is responsive to the voltage REG B+, and can include, for example, a comparator having inputs coupled to output voltage REG B+ and to a voltage divider providing a predetermined threshold. Error amplifier A is optically coupled through an opto-coupler $\mu1$ to control a triggering level or threshold of a comparator transistor Q3.

Advantageously, each of winding T1W2 and T1W3 is tightly coupled to primary winding T1W1 in transformer T1 in a manner to reduce leakage inductance. The leakage inductance $L_L$ is approximately 1.5 microhenry. Whereas, each of the secondary windings is coupled to its respective load via a corresponding low in impedance current path. Consequently, the voltages developed in secondary windings T1W2 and T1W3 tend to track each other. This is possible due to the absence of a conventional choke in series with each of the secondary windings.

In carrying out an inventive feature, the inductance $L_{res}$ on the primary side of transformer T1 is transformer coupled to limit the rate of change of each of currents IDOUT3 and IDOUT2 in the current paths that include diodes DOUT3 and DOUT2, respectively, during forward conduction. Thus, advantageously, no choke is required to be coupled in series with any of windings T1W2 and T1W3. Advantageously, inductance Lres is shared in common with each of windings T1W2 and T1W3. Maintaining each of winding T1W2 and T1W3 tightly coupled to primary winding T1W1 simplifies the design of transformer T1 and reduces losses in transformer T1.

In addition to the optically coupled signal from opto-coupler $\mu1$, the base drive circuits are coupled to current sensing resistor R7 in series with switching transistor Q1. When transistor Q1 is turned on, as explained later on, the voltage across resistor R7, which is proportional to the current level in transistor Q1, is coupled to the base of comparator transistor Q3. Transistor Q3 forms a regenerative latch with another transistor Q2, which is coupled back to the base of switching transistor Q1 and to the secondary winding T2W2 of current transformer T2.

Advantageously, the current provided in secondary winding T2W2 is proportional to the current in the primary winding T2W1 of transformer T2, which is in series with winding T1W1 of transformer T1 and switching transistor Q1. Therefore, the base current drive signal iB varies approximately linearly with the collector current iQ1. Advantageously, over-driving of the base of transistor Q1 is prevented by a proportional drive technique. The same current transformer functions to provide the advantages of proportional drive, self-oscillation and zero voltage switching in forward type voltage converter 300, as explained later on.

Transistor Q3 of the regenerative latch, comprising transistors Q2 and Q3, functions as a comparator. The current-representative voltage on resistor R7 is coupled to charge capacitor C7 through resistor R8, and the voltage on capacitor C7 is coupled to the base of transistor Q3 through a small resistor R9. When the voltage at the base of transistor Q3 exceeds the voltage at its emitter sufficiently to forward bias the base-emitter junction, transistor Q3 conducts and the latch formed by transistors Q2 and Q3 draws current away from the base of switching transistor Q1. The voltage at the emitter of transistor Q3 is developed from the charge in capacitor C6. The emitter voltage in capacitor C6 is limited to a forward diode drop by diode D7, coupled to ground. The charge in capacitor C6 is replenished while transistor Q3 is conducting and is drained by opto-coupler $\mu1$ when it conducts in response to an output signal of error amplifier A.

The collector of NPN transistor Q3 is coupled to the base of PNP transistor Q2 and the collector of transistor Q2 is coupled to the base of transistor Q3, forming a regenerative switch. A control voltage coupled to the control terminal (i.e., the base) of switching transistor Q1 is developed at the emitter of transistor Q2, which forms an output of the regenerative switch arrangement and is coupled to the base of transistor Q1 via a resistor R5.

Secondary winding T2W2 of current transformer T2 provides a drive current supply for switching transistor Q1. The voltage across winding T2W2 is an alternating current (AC) voltage, produced when switching transistor alternately conducts and is turned off. Advantageously, when transistor Q1 is turned on, transformer T2 provides proportional drive to transistor Q1 for maintaining transistor Q1 in saturation without over-driving transistor Q1. On the other hand, when transistor Q1 is nonconductive, resonant voltage VQ1 at the collector of transistor Q1 is coupled to the base of transistor Q1 to maintain transistor Q1 nonconductive.

FIGS. 2a through 2d illustrate certain voltage and current signals identified in FIG. 1, through two oscillation cycles. Power on, start-up of the oscillation cycles occurs due to current flowing through resistor R4. Resistor R4 coupled in series with resistor R2 couples the RAW B+ supply to the base of switching transistor Q1. Resistor R4 is large, and provides a small amount of start-up base current drive to transistor Q1. As transistor Q1 conducts, however, current transformer T2 causes a current to flow in secondary winding T2W2 which is proportional to the current in primary winding T2W1, as a function of their turns ratio, for example 20% for a turns ratio of 2:10. Diode D1 in series with secondary winding T2W2 couples this current via resistor R2 to the base of transistor Q1. The added base drive current sustains saturation for the added collector current in a regenerative manner, causing the base current to increase in proportion to the increase in collector current. Transistor Q1 saturates and the collector current continues to flow until base drive current is removed by action of transistors Q2 and Q3.

When the voltage across current sensing resistor R7 is sufficient to cause transistor Q3 to conduct, triggering current is provided at the base of transistor Q2, which also conducts and adds to the voltage at the base of transistor Q3, producing additional drive current in transistor Q3 and also operating in a regenerative manner to latch on. Resistor R3 and capacitor C4 provide proper biasing for transistor Q2. The low impedance of latched drive transistor Q2 quickly removes the base charge from the base of switching transistor Q1. The result is that transistor Q1 is turned off.

During the time that transistor Q1 is conducting, positive current flows into the base through resistor R2 and capacitor C2, which causes capacitor C2 to charge to several volts, more positive on the terminal coupled to resistors R4 and R5 and less positive at the base of transistor Q1. When transistors Q2 and Q3 latch, they provide a low impedance path to ground, causing the voltage on capacitor C2 to apply a negative bias to the base of transistor Q1. This improves the speed at which transistor Q1 switches off by quickly removing the base charge in transistor Q1.

Diodes D4 and D5 are coupled in series with one another and the emitter of switching transistor Q1. When transistor Q1 is conducting, there is a forward biased voltage drop across diodes D4, D5, namely about two volts. Capacitor C5, in parallel with series diodes D4, D5, charges to this voltage. The charge on capacitor C5 provides additional negative bias during turn off of transistor Q1, especially during start-up, when capacitor C2 may not be fully charged. In this way, sufficient negative bias is applied to the base of transistor Q1 to ensure quick turn off. Diode D6 and resistor R6, which are coupled between the collector of transistor Q2 and current sensing resistor R7, shunt some of the reverse base current to resistor R7, which is low in impedance, for example a fraction of an ohm. This shunting reduces the tendency to overdrive the base of transistor Q3, which would otherwise cause excessive storage time and poor switching performance.

After transistor Q1 is turned off, transformer T2 winding T2W2 produces a negative voltage across series coupled diode D2 and resistor R1. Drive transistors Q2 and Q3 remain latched until the current flowing through them drops below a threshold needed to keep them regeneratively latched. Thereafter, the voltage across series coupled diode D2 and resistor R1 keeps transistor Q1 from conducting.

Eventually, the resonant action of resonant circuit 301 causes the base-emitter voltage to reverse polarity. When the voltage at the base of switching transistor Q1 increases to a sufficient magnitude, current begins to flow in the base of transistor Q1, producing collector current that grows regeneratively as discussed, beginning the next cycle. Collector current iQ1 in transistor Q1 begins flowing when collector voltage VQ1 is at zero volts. Thereby, zero voltage switching is obtained.

Advantageously, current transformer T2 provides for self-oscillations. In the circuit coupled to secondary winding T2W2 of transformer T2, diode D2 and resistor RI limit the negative voltage developed during the off time of transistor Q1. Because diode D2, resistor R1 and capacitor C1 form a low impedance, transformer T2 operates as a current transformer during the turn off interval. Diode D1 provides a current path for the forward drive current and also limits the charging of capacitor C1, in parallel with diode D1, to the forward voltage developed across diode D1 when conducting. Diode D1, resistor R2 and the base-emitter junction of transistor Q1 form a low impedance during the turn on interval of transistor Q1. Thus, transformer T2 operates as a current transformer. Advantageously, by operating as a current transformer, transformer T2 need not have to store large magnetic energy and can have a small core.

Negative base current, which is blocked by diode D1, flows through capacitor C1 during the turn off interval of transistor Q1. Diode D3 and capacitor C3 are coupled to rectify and filter the negative voltage produced by transformer T2, and provide a negative supply voltage coupled to the emitter of the phototransistor in opto-coupler μ1.

FIGS. 2a–2d illustrate waveforms useful for explaining the operation of the tuned switch mode power supply circuit shown in FIG. 1. Similar symbols are used to identify points or paths in the circuit of FIG. 1 with their voltage and current signals in FIGS. 2a–2d.

FIG. 2a shows the voltage VQ1 (in a solid line) and the current iQ1 (dashed line) in the collector of transistor Q1. FIG. 2b shows the voltage VB (dashed line) and current iB (solid line) at the base of transistor Q1. When positive base voltage VB becomes available, the base current iB and collector current iQ1 rise gradually until transistor Q1 current iQ1 reaches a peak at about 8 A. The rectifiers in the secondary windings conduct, during the forward conduction times of transistor Q1, shown by current iDOUT in FIG. 2c.

Upon turn off, the base current drive is driven to reverse abruptly to a negative absolute value greater than its positive value, for example by a factor of two. During turn off of transistor Q1, the resonant voltage VQ1 at the collector of transistor Q1, which is also the voltage on capacitor C8, rises and then falls, resonantly.

During the resonant cycle, after the voltage VQ1 on capacitor C8 falls to zero, diode D8 clamps the voltage to near ground potential, conducting for a time as shown in FIG. 2d until base and collector currents iB and iQ1 begin to increase.

The inventive tuned switch mode power supply as shown operates in a current mode control, on a current-pulse by current-pulse control basis. The current pulses iQ1 an iB in the collector and base of transistor Q1, respectively, terminate when the collector current reaches the threshold level of transistor Q3 in FIG. 1, namely the level of current sensed by resistor R7 sufficient to raise the voltage at the base of transistor Q3 by more than the base-emitter forward bias voltage level over the voltage on capacitor C6. The charge on capacitor C6 is adjusted by conduction of the phototransistor of opto-coupler μ1, responsive to signals from error amplifier A. In this manner the voltage is closely regulated on a current pulse basis.

The inventive circuit responds to current and can instantaneously correct in a feed forward manner for input voltage variations on RAW B+, without the need to use the dynamic range of error amplifier A and without the delay of waiting for input voltage variations to appear at the output. In this way, both the advantages of current mode regulation and of a tuned switch mode power supply are obtained.

The secondary windings T1W2 and T1W3 are tightly coupled in transformer T1 to primary winding T1W1. The low impedance in the current path of each of conductive diodes DOUT2 and DOUT3 is interposed between the corresponding winding T1W2 or T1W3, and the corresponding filter capacitor CFILTER2 or CFILTER3. Advantageously, because of the low impedance in each current paths, unsensed voltage U is regulated to a significant extent even though only voltage REG B+ is sensed in error amplifier A.

What is claimed is:

1. A forward converter, comprising:
    a transformer having a first winding and a second winding;
    a source of an input supply voltage;
    a switching transistor responsive to a periodic switching control signal for periodically applying said input supply voltage to said first winding to generate current pulses in said switching transistor;
    a rectifier coupled to said second winding for rectifying a transformer-coupled voltage in said second winding to generate a rectified output supply voltage coupled to a load, said output supply voltage being generated during a portion of a given period when said input supply voltage is applied to said first winding, to provide forward converter operation;
    an inductor coupled to said second winding via said first winding for limiting a rate of change of a current flowing in said rectifier and of said current pulses in said switching transistor;
    a capacitance coupled to said inductor to form a resonant circuit; and
    a control circuit responsive to a resonant voltage developed in said resonant circuit for generating said switching control signal having switching timings that control said output supply voltage to provide zero voltage switching in said switching transistor, said control circuit being responsive to said current pulses in said transistor to control said switching transistor current pulses in a current mode, on a current-pulse by current-pulse control basis.

2. A converter according to claim 1, wherein said inductor is coupled in series with said first winding.

3. A converter according to claim 1, wherein a low impedance is formed in a current path between said second winding and said load during said period portion.

4. A converter according to claim 1, wherein said control circuit is responsive to said output supply voltage for varying a duty cycle of said switching control signal in a negative feedback manner to regulate said output supply voltage.

5. A forward converter according to claim 1, further comprising a filter capacitor coupled to said rectifier, wherein a low impedance is formed in a current path between said second winding and said filter capacitor and wherein said inductor limits current flow in said current path.

6. A forward converter according to claim 1, wherein said first and second windings form a primary winding and a secondary winding of said transformer, respectively.

7. A forward converter according to claim 1, wherein said transformer further comprises:
    a third winding; and
    a second rectifier coupled to said third winding for rectifying a transformer-coupled voltage developed in said third winding to produce a rectified, second output voltage coupled to a second load, said inductor being coupled to said third winding via said first winding for limiting a rate of change of a current in said second rectifier.

8. A forward converter according to claim 7, wherein said second and third windings are tightly coupled to provide for tracking of voltages developed therein.

9. A forward converter according to claim 7, wherein a low impedance is formed in a current path between said third winding and said second rectifier.

10. A forward converter according to claim 1, further comprising a capacitance coupled to said first winding to form a resonant circuit when said transistor is non-conductive and wherein said control circuit is responsive to a resonant voltage developed in said resonant circuit for providing zero voltage switching in said switching transistor.

11. A forward converter, comprising:
    a transformer having a first winding, a second winding and a third winding;
    a source of an input supply voltage;
    a switching transistor responsive to a periodic switching control signal for periodically applying said input supply voltage to said first winding to generate current pulses in said switching transistor;
    a first rectifier coupled to said second winding for rectifying a transformer-coupled voltage developed in said second winding, said transformer-coupled voltage being coupled via said first rectifier to a first load to develop a rectified first output supply voltage in said first load, during a portion of a given period when said input supply voltage is applied to said first winding in a forward converter operation such that a first current path between said second winding and said load and including said first rectifier, has a low impedance;
    a second rectifier coupled to said third winding for rectifying a transformer-voltage developed in said third winding to develop a rectified, second output voltage coupled to a second load, such that a second current path between said third winding and said second load and including said second rectifier has a low impedance during said period portion;
    an inductor coupled to said first winding for limiting in common a rate of change of a current flowing in each of said first and second current paths and in said switching transistor; and
    a control circuit for generating said switching control signal, having switching timings that control said switching transistor current pulses in a current mode control basis.

12. A forward converter according to claim 11, further comprising:
    a third winding of said transformer; and
    a second rectifier coupled to said third winding for rectifying a transformer-voltage developed in said third winding to produce a rectified, second output voltage coupled to a second load, wherein a second current path that includes said second rectifier between said third winding and said second load has a low impedance during said period portion and wherein said inductor limits a rate of change of a current in said second rectifier.

13. A forward converter according to claim 11, wherein each of said second and third windings is tightly coupled to said first winding to reduce leakage inductance in said transformer.

* * * * *